United States Patent [19]

Carlin et al.

[11] Patent Number: 4,648,452

[45] Date of Patent: Mar. 10, 1987

[54] METHOD OF INCREASING ENHANCED OIL RECOVERY BY USING A NOVEL LOW SULFONATE PHASE IN THE POLYMER SLUG

[75] Inventors: Joseph T. Carlin, Houston; Gilbert L. Haferkamp, Manvel, both of Tex.

[73] Assignee: Texaco Inc., White Plains, N.Y.

[21] Appl. No.: 729,451

[22] Filed: May 1, 1985

[51] Int. Cl.$^4$ .................. E21B 43/22; E21B 43/40
[52] U.S. Cl. ................... 166/274; 166/267; 252/8.554
[58] Field of Search .................. 252/8.55 D; 166/273–275

[56] References Cited

U.S. PATENT DOCUMENTS

| | | | |
|---|---|---|---|
| 4,079,785 | 3/1978 | Hessert et al. | 252/8.55 D |
| 4,239,628 | 12/1980 | Vinatieri | 166/274 |
| 4,513,820 | 4/1985 | Maddox, Jr. | 252/8.55 D |
| 4,516,635 | 5/1985 | Maddox, Jr. | 252/8.55 D |
| 4,518,038 | 5/1985 | Maddox, Jr. et al. | 252/8.55 D |

*Primary Examiner*—Stephen J. Novosad
*Assistant Examiner*—Bruce M. Kisliuk
*Attorney, Agent, or Firm*—Jack H. Park; Kenneth R. Priem; Cynthia L. Kendrick

[57] ABSTRACT

This invention relates to a process for enhanced recovery of hydrocarbons from a subterranean hydrocarbon-bearing formation penetrated by an injection well and a production well wherein, before injection, the surfactant fluid is separated into two phases by the addition of small amounts of polymer and the portion having the higher sulfonate content is used as the surfactant slug. As an improvement we disclose the step of adding the phase of surfactant fluid with the lower sulfonate content to the polymer slug which is used to drive the surfactant fluid to further increase recovery.

14 Claims, No Drawings

METHOD OF INCREASING ENHANCED OIL RECOVERY BY USING A NOVEL LOW SULFONATE PHASE IN THE POLYMER SLUG

CROSS-REFERENCE TO RELATED APPLICATION

This application is related to U.S. patent application Ser. No. 06/729,452, filed of even date, which is concerned with a method for enhanced hydrocarbon recovery wherein a polymer is dissolved in fluid resulting from mixing water, sulfonate-containing surfactant and solubilizer, allowing the mixture to separate and using the fraction with the highest sulfonate content as the surfactant fluid.

FIELD OF THE INVENTION

This invention relates to a process for enhanced recovery of hydrocarbons from a subterranean hydrocarbon-bearing formation penetrated by an injection well and a production well wherein, before injection, the surfactant fluid is separated into two phases by the addition of small amounts of polymer and the portion having the higher sulfonate content is used as the surfactant slug. As an improvement, we disclose a method of adding the phase of surfactant mixture with the lower sulfonate content to the polymer slug which is used to drive the surfactant fluid, to further increase recovery.

BACKGROUND OF THE INVENTION

This invention relates to surfactant flooding fluids for the enhanced recovery of petroleum from porous subterranean reservoirs.

The petroleum industry has long recognized that only a fraction of the original oil in a reservoir is expelled by natural mechanisms or primary production. Accordingly, there is a need for improved methods of increasing the ultimate yield of petroleum from natural reservoirs. Many large reserves of petroleum fluids from which only small recoveries have been realized by present commercial recovery methods are yet to reach a potential recovery approaching their estimated oil-in-place.

The production of petroleum products is usually accomplished by drilling into a hydrocarbon-bearing formation and utilizing one of the well-known recovery methods for the recovery of hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, water flooding and steam processing may still leave up to 70–80 percent of the original hydrocarbons in place.

Water flooding is one of the more widely practiced secondary recovery methods. A successful water flood may result in recovery of 30–50 percent of the original hydrocarbons left in place. However, generally the application of water flooding to many crudes results in much lower recoveries.

The application of these secondary recovery techniques to depleted formations may leave major quantities of oil-in-place, since the crude is tightly bound to the sand particles of the formation; that is, the sorptive capacity of the sand for the crude is great. In addition, interfacial tension between the immiscible phases results in entrapping crude in the pores, thereby reducing recovery. Therefore, methods of tertiary or enhanced recovery have been proposed.

Various additives can be added to the flood water to increase oil displacement. For instance a surfactant such as a petroleum sulfonate may be added to the water to lower the interfacial tension between oil and water. If enough surface active ingredient is added to lower the interfacial tension sufficiently, then more oil can be displaced from a reservoir by the water containing the surfactant than can be displaced by water not containing the surfactant, or surface active agent. If addition of a surface active agent lowers the interfacial tension to a value of 0.01 dynes per centimeter or lower, then water containing the surface active agent will displace essentially all of the oil from most of the reservoir. In contrast water not containing a surfactant will leave an oil saturation in the reservoir usually between 15 and 50 percent of the pore volume. Thus, the purpose of adding a surfactant such as a petroleum sulfonate to water is to increase the microscopic displacement of oil from the volume of the reservoir rock contacted by the water.

Another additive commonly employed in such fluids is a polymer. The purpose of adding polymer to the surfactant fluid is to decrease the mobility of the fluid in the reservoir. This increases the volumetric sweep of the surfactant solution or, in other words, allows the solution to contact a much larger volume of the reservoir than it would without the polymer. The polymer also enhances the formation of an oil bank in front of the surfactant slug. Thus both surfactant and polymer are usually considered required to ensure both good macroscopic and microscopic (or volumetric) displacement of oil.

U.S. Pat. No. 4,049,054 discloses a method of preparing a stable surfactant water flooding fluid comprising contacting a polymer with fresh water in the substantial absence of a salt and thereafter combining the thus formed polymer solution and a salt solution and finally adding a surfactant. It is thought the particular steps of mixing the components provides a more stable mixture for injection.

U.S. Pat. No. 4,252,192 discloses a process for enhanced oil recovery using the product obtained by mixing a major proportion of a petroleum oil feed stock, and a minor proportion of an additive, such as an oxygenated hydrocarbon, with $SO_3$ under sulfonation conditions, mixed with about 0.5 to 20% of water at about 50° to 150° C. for a relatively brief period of time and then neutralizing the resultant material with a base.

In many of the enhanced oil recovery methods known in the art, where a surfactant is employed in the flood operation, a generally accepted practice is to follow the surfactant solution with a polymer under pressure. Contrary to the intended result, often the polymer does not follow the same path as the surfactant, tends to "finger" and bypass the surfactant and therefore much surfactant and potentially recoverable oil is left behind when the polymer is produced. Several reasons for this are proposed. The necessity of the surfactant in the first place is due to the immiscibility of water used in waterflooding with the oil which is supposed to be recovered. However, it is common to add a surfactant to promote water oil miscibility and then follow the solution with a polymer that is not miscible with that surfactant fluid.

In copending U.S. patent application Ser. No. 729,452, a polymer is added to the brine-sulfonate-solubilizer fluid, the mixture allowed to separate, and the fraction with the highest sulfonate content used in the flooding operations. The displacing polymer had a high interfacial tension with the surfactant. By adding the separated surfactant fraction with the lower sulfonate content to the polymer slug the interfacial tension between the surfactant and polymer slugs was lowered making the displacement more efficient.

Using the invention disclosed herein, it is believed that the efficiency of flood operations employing a surfactant fluid and polymer slug can be further improved. Some of the disadvantages of the prior art are avoided and there is an improvement in the percentage of oil produced by enhanced or tertiary recovery.

SUMMARY OF THE INVENTION

These desirable ends are accomplished by the process of the present invention for enhanced recovery of hydrocarbons which comprises:

Injecting a surfactant fluid comprising the separated fraction having the highest sulfonate content from a mixture of water, petroleum sulfonate surfactant, solubilizer and polymer into a well and thereafter adding the remaining fraction of surfactant fluid which contains the lower sulfonate content to a polymer slug, injecting the polymer slug and forcing said high sulfonate content surfactant slug and subsequently the low sulfonate polymer slug through the formation and recovering said hydrocarbons.

The improvement of this process over that in copending U.S. patent application Ser. No. 729,452, is the addition of the fraction containing the low sulfonate content to the polymer slug for further increases in efficiency of enhanced recovery and increased miscibility of the polymer slug with the surfactant slug.

Other advantages, uses and the like of the present invention will be apparent to those skilled in the art from the following description of preferred embodiments thereof, although variations and modifications may be effected without departing from the spirit and scope of the novel concepts presented herein.

DETAILED DESCRIPTION

In the narrower practice of the present invention a process for enhanced recovery of hydrocarbons is disclosed which comprises:

injecting into the well a surfactant fluid comprising about 0.1% to about 20.0% of total solute by weight petroleum sulfonate surfactant; about 0.1% to about 5% of total solute by weight solubilizer dispersed in the water; about 0.1 to 10% by weight polymer, wherein the surfactant fluid formed is the product of dissolving the polymer in the water-surfactant-solubilizer fluid, allowing the mixture to separate, separating the fraction with the highest sulfonate content to use as the surfactant fluid and separating the remaining fraction which contains the lower sulfonate content to add to the polymer slug, forcing said high sulfonate content surfactant slug, and subsequently the low sulfonate content containing enriched polymer slug through the formation and recovering said hydrocarbons.

As indicated the surfactant solution employed in the process of this invention typically is composed of water or brine, a sulfonate and a solubilizer and a polymer combined, wherein the water, surfactant and solubilizer are combined, a small amount of polymer is added and the mixture is allowed to separate with subsequent use of the fraction with the highest sulfonate content as the surfactant flood fluid and addition of the fraction with the lower sulfonate content to the polymer slug which generally follows the surfactant flood.

A description of the first embodiment of the process is described in detail in copending application Ser. No. 729,452, the specification of which is herein incorporated by reference.

The water employed is usually brine from the reservoir site, but it can be most any available water including raw tap water, demineralized or softened water, deionized water, etc., as well as other forms of water. Generally it is most economical to use brine water from a reservoir; however, certain characteristics of the available brine should be considered which might influence the efficiency of the enhanced recovery system. For example, some oil field chemicals such as corrosion inhibitors can be detrimental to surfactant flooding; therefore care should be taken to make sure the reservoir brine is devoid of these chemicals.

Numerous surfactants or combinations of surfactants may be employed in the process of the invention. The preferred class of surfactant is determined by the formation temperature and the salinity.

The petroleum sulfonates which can be used as surfactants include all commercial sulfonates and especially useful are surfactants that contain mono-poly sulfonate mixtures. The sulfonate surfactants particularly useful in this invention have an average molecular weight greater than about 300, such as those described in U.S. Pat. Nos. 3,714,062 and 3,997,451 which are expressly incorporated by reference herein for discussion of sulfonate materials which will act as surfactants. Suitable sulfonate surfactants include petroleum sulfonates which generally include whole to top crude oils, gas oils or other fractions of a crude oil stream; aliphatic hydrocarbon polymer sulfonates such as, for example, alkaline metal straight chain hydrocarbon polybutene or polypropylene polymer sulfonates synthetically prepared aromatic polymer sulfonates; or polymers with other sulfonate groupings thereon possessing surfactant characterstics.

An especially preferred sulfonate is one having an average equivalent molecular weight in the range of from 300 to about 700. Particularly suitable are surfactants with a molecular weight in the range of from 360–420. Very good results have been observed using WITCO ® TRS sulfonates which have average equivalent molecular weights of 300–600.

The concentration of the surfactant will generally be within the range of 0.1% to 20.0% of total solute by weight and preferably 0.1% to 10.0% weight percent based on the total weight of the surfactant flood fluid.

Solubilizers are employed to keep the surfactants in solution. A large variety of commercial solubilizers are functional. Suitable solubilizers include two sulfated ethoxylated alcohols sold under the trademarks ALFONIC ® 1412-A and 1412-S by Conoco Chemical Co. Sulfated ethoxylated solubilizers are stable where reservoir temperatures do not exceed about 50° C. In higher temperature reservoirs, ethoxylated sulfonates are preferred.

A variety of polymers can be used in the practice of this invention. Polysaccharides and polyacrylamides are among those which will work. In the process of the invention small amounts of polymer are added to the water-surfactant-solubilizer fluid and time is allowed for the polymer to dissolve and for the mixture to separate so the portion with the highest sulfonate content can be separated and used in flooding. The optimally effective amount of polymer to be used can be determined by performing bottle tests on the premixed sulfonate mixture. To a series of bottles containing the sulfonate mixture is added increasing concentrations of polymer starting at about 0.1% through 10%. The mixtures are allowed to stand for 1 or 2 days. The resultant mixtures will be one phase then two phases with different proportions of the two phases. A mixture with the fraction with the highest sulfonate content being about 90% of the total mixture works very well. Generally the amount of polymer will range from 100 ppm to 300 ppm and preferably about 200 ppm.

Example I of Copending U.S. Ser. No. 729,452 demonstrates in more detail how the components of the invention are actually mixed and how the fraction with the higher sulfonate content is recognized.

If the process of this invention were used commercially the type of tanks used presently in fields where flooding procedures are taking place should be suitable to use for mixing large amounts of water, surfactant and solubilizer within the range of proportions discussed, and then adding the appropriate amount of polymer and allowing the solution to settle. The surfactant phase at the bottom, for example, could be injected and as the upper phase reached the outlet the polymer slug would be mixed with the upper phase and injected. However, if larger quantities of surfactant were needed the surfactant could be drawn off the bottom of several tanks and collected in a larger tank.

Polyacrylamides useful in the process of this invention include all commercial polyacrylamides. Generally the number average molecular weight of the polyacrylamide or partially hydrolyzed polyacrylamide or salts thereof utilized in this invention and of the alkoxylated polyacrylamide or partially hydrolyzed polyacrylamide or salts thereof will range from about 10,000 to about 2,000,000 or more. Polyacrylamide, partially hydrolyzed polyacrylamide or salts thereof which are manufactured and sold by a number of chemical manufacturers are prepared by the usual vinyl compound polymerization methods. NAFLO ® F polyacrylamide works well. It is manufactured by Nalco.

Another class of hydrophilic polymeric water thickening materials suitable for use in this invention is the polysaccharide compounds, many of which are readily available commercially. An example is Kelzan polysaccharide, manufactured by Xanco division of Kelco Corporation and functions best as the polymer slug rather than as the polymer added to the surfactant fluid.

It is essential that the polymer-surfactant solution be thoroughly mixed. Accordingly mixing times of up to 24 hours may be employed. Depending on the efficiency of the mixing systems, times of 24 to 168 hours, preferably 24 to 72 hours are satisfactory for settling time.

By practicing the principles of this invention one is able to obtain enhanced oil recovery yields as high as 99% from core samples, compared to typically lower yields obtained with only surfactants such as petroleum sulfonates and solubilizers in reservoir water or using the same mixture with a polymer, but without separating and using the phase having the higher surfactant content followed by a polymer slug containing the fraction containing the lower sulfonate content as taught by this invention.

The surfactant flood fluid of this invention can be used in the same manner as similar fluids of the prior art. For instance, a preflush can be introduced into an injection well followed by the surfactant fluid of this invention containing a higher concentration of sulfonates which is the product of dissolving a small amount of polymer in a solution of reservoir water containing surfactant and solubilizer, then allowing the mixture to separate. In most cases the portion with the highest mono-sulfonate content is the lower phase, but depending on the densities of the chemicals it may be the upper phase. Then where a polymer under pressure is injected after the surfactant fluid mixture, the process of this invention can be utilized, comprising injecting under pressure a polymer slug containing the phase remaining which is made up of a surfactant-brine-solubilizer-polymer mixture containing the lower sulfonate content.

Temperature, time and pressure conditions are not critical. The temperature is usually room temperature, but it should be less than 180° C. In the operation of this invention the pressure is generally low and may range from atmospheric to reservoir pressure.

With the foregoing disclosure in mind, the following examples are presented which will illustrate to those of ordinary skill in the art the manner in which this invention is carried out. However, the examples which follow are not to be construed as limiting the scope of the invention in any way and the examples merely point out methods of obtaining the greatest efficiency in use of the invention.

The experiments demonstrate that using the separated phase of this invention having low sulfonate content, resulting from mixing a small amount of polymer with the water-surfactant-solubilizer and separating the phase with the lower sulfonate content to add to the polymer slug results in higher percentages of enhanced recovery than found using other flooding compositions.

EXAMPLE I

A Berea sandstone core was saturated with Salem reservoir brine and flooded with Salem Crude oil. The core was then water flooded with Salem injection water. A surfactant flooding fluid was mixed comprising 1.8% STEPAN PETROSTEP ® 465 petroleum sulfonate and 0.7% ALFONIC ® 1412-A solubilizer in Salem Injection water. This mixture was injected into the core as the surfactant slug and displaced by 1000 ppm Kelzan polysaccharide polymer followed by tap water. Kelzan is manufactured by the Xanco division of Kelco Corporation. The core gave a tertiary recovery of 62.5%.

COMPARATIVE EXAMPLE IA

A Berea sandstone core was saturated with Salem reservoir brine and flooded with Salem Crude oil. The core was then water flooded with Salem injection water. A surfactant flooding fluid was mixed comprising 1.8% STEPAN PETROSTEP ® 465 petroleum sulfonate and 0.7% ALFONIC ® 1412-A solubilizer in Salem Injection water. To this brine-surfactant-solubilizer mixture was added 300 ppm NAFLO ® F polyacrylamide. The polymer was allowed to mix in the surfactant fluid and the mixture allowed to separate. The time was not critical and may range from 10–1000 hours. In this example the separation occurred within 1 day or about 24 hours. The mixing proceeded at room temperature and atmospheric pressure.

When the mixture had separated into two phases, the fraction with the highest sulfonate content was separated for use as a surfactant fluid in the tertiary or enhanced recovery. The remaining phase was mixed with the 1000 ppm Kelzan polysaccharide slug. The surfactant was displaced by the surfactant enriched polymer slug and this in turn by tap water. When the core was displaced by this mixture, the core gave a tertiary recovery of 76%.

COMPARATIVE EXAMPLE IB

A Berea sandstone core was saturated with Salem reservoir brine and flooded with Salem Crude oil. The core was then water flooded with Salem injection water. A surfactant flooding fluid was mixed comprising 1.8% STEPAN PETROSTEP ® 465 petroleum sulfonate and 0.7% ALFONIC ® 1412-A solubilizer in Salem Injection water. To this brine-surfactant-solubilizer mixture was added 300 ppm NAFLO ® F polyacrylamide. The polymer was allowed to mix in the surfactant fluid and the mixture allowed to separate. The time was not critical and could range from 10–1000 hours. In this example the separation occurred within 1 day or about 24 hours. The mixing proceeded at room temperature and atmospheric pressure.

When the mixture had separated into two phases, the fraction with the highest sulfonate content was separated for use as a surfactant fluid in the tertiary or enhanced recovery. The remaining phase was mixed with the 1000 ppm Kelzan polysaccharide slug. The surfactant was displaced by the surfactant enriched polymer slug and this in turn by tap water. When the core was displaced by this mixture, the core gave a tertiary recovery of 94.2%.

EXAMPLE II

A Berea sandstone core was saturated with Salem reservoir brine and flooded with Salem Crude oil. The core was then water flooded with Salem injection water. A surfactant flooding fluid was mixed comprising 1% WITCO ® TRS-40 and 0.8% WITCO ® TRS-18 petroleum sulfonates and 0.7% ALFONIC ® 1412-A solubilizer in Salem Injection water. This mixture was injected into the core as the surfactant slug and displaced by 1000 ppm Kelzan polysaccharide polymer followed by tap water. The core gave a tertiary recovery of 64.5%.

COMPARATIVE EXAMPLE IIA

A Berea sandstone core was saturated with Salem reservoir brine and flooded with Salem Crude oil. The core was then water flooded with Salem injection water. A surfactant flooding fluid was mixed comprising 1% WITCO ® TRS-40, 0.8% WITCO ® TRS-18 petroleum sulfonates and 0.7% ALFONIC ® 1412-A solubilizer in Salem Injection water. To this brine-surfactant-solubilizer mixture was added 300 ppm NAFLO F polyacrylamide. The polymer was allowed to mix in the surfactant fluid and the mixture allowed to separate. The time was not critical and could range from 10–1000 hours. In this example the separation occurred within 1 day or about 24 hours. The mixing proceeded at room temperature and atmospheric pressure.

When the mixture had separated in two phases, the fraction with the highest sulfonate content was separated for use as a surfactant fluid in a tertiary or enhanced recovery. The surfactant was displaced by 1000 ppm Kelzan polysaccharide followed by tap water. When the oil was displaced by this mixture the core gave a tertiary recovery of 80.1%.

COMPARATIVE EXAMPLE IIB

A Berea sandstone core was prepared and water flooded as in Example II. A surfactant flooding fluid was mixed comprising 1% WITCO ® TRS-40, 0.8% WITCO ® TRS-18, petroleum sulfonates and 0.7% ALFONIC ® 1412-A solubilizer in Salem injection water. 300 ppm NAFLO ® F polyacrylamide was added to this mixture and allowed to separate. The fraction with the highest sulfonate content was used as the surfactant slug. The other phase was added to the 1000 ppm Kelzan polysaccharide slug. The surfactant slug was displaced by the sulfonate enriched polymer slug and this in turn by tap water. The tertiary displacement for this displacement was 99.3%.

The significant end point values for these examples are tabulated in Table I.

TABLE I

| | CORE DISPLACEMENT TESTS | | | | | |
| --- | --- | --- | --- | --- | --- | --- |
| | STEPAN ® Surfactant | | | WITCO ® Surfactant | | |
| | I | IA | IB | II | IIA | IIB |
| Initial Oil Saturation | 73.0% | 72.6% | 66.6% | 69.8% | 72.4% | 65.7% |
| Oil Saturation After Water Flood | 43.4% | 43.1% | 39.7% | 41.3% | 45.6% | 38.2% |
| % Recovery by Water Flood | 40.5% | 40.6% | 40.4% | 40.8% | 37.5% | 41.9% |
| Oil Saturation After Chemical Flood | 16.3% | 10.3% | 2.3% | 14.6% | 9.0% | 0.3% |
| % Recovery After Chemical Flood | 77.7% | 85.8% | 96.5% | 79.0% | 87.5% | 99.6% |
| % Recovery By Chemical Flood | 62.5% | 76.0% | 94.2% | 64.5% | 80.1% | 99.3% |

The experiments demonstrate that using the separated phase, having the lower sulfonate content which remains after separating the higher sulfonate containing fraction used as the surfactant slug, and enriching the polymer slug with it resulted in even greater percentages of enhanced recovery than using the process described in Ser. No. 729,452 alone.

What is claimed is:

1. A process for enhanced hydrocarbon recovery comprising injecting into a well a surfactant fluid comprising the fraction having the highest sulfonate content which separates after settling from a mixture of water, petroleum sulfonate surfactant, solubilizer and polymer and thereafter adding the remaining fraction of surfactant fluid which contains the lower sulfonate content to a polymer slug, injecting the polymer slug and forcing said high sulfonate content surfactant slug and subsequently the low sulfonate polymer slug through the formation and recovering said hydrocarbons.

2. The process of claim 1, wherein the polymer added to the surfactant fluid mixture is selected from the group consisting of polyacrylamides, polysaccharides and any high molecular weight polymer which tends to reduce the mobility of an aqueous surfactant mixture.

3. The process of claim 2, wherein the polymer added to the surfactant fluid is a polyacrylamide.

4. The process of claim 2, wherein the polymer added to the surfactant is a polysaccharide.

5. The process of claim 3, wherein the polyacrylamide is Naflo F polyacrylamide.

6. The process of claim 4, wherein the polymer is Kelzan polysaccharide.

7. The process of claim 1, wherein the surfactant fluid is made up of reservoir water with petroleum sulfonates and solubilizers added for stability.

8. The process of claim 7, wherein the petroleum sulfonates are selected from the group consisting of all commercial sulfonates.

9. The process of claim 8 wherein the petroleum sulfonates are selected from the group consisting of WITCO® TRS-40, WITCO® TRS-18 and STEPAN PETROSTEP® 465.

10. The process of claim 1 wherein the polymer is present in the surfactant fluid in an amount within the range of 0.1 to 10% by weight based on the total weight of said surfactant fluid.

11. The process of claim 1 wherein the polymer is present in an amount of 50 to 500 ppm or 0.1% to 10% by weight and said surfactant fluid contains surfactant present in an amount in the range of 0.1% to 20.0% based on the weight of said fluid.

12. The process of claim 1 wherein the polymer is present in amount of about 100 ppm to 300 ppm.

13. The process according to claim 1 wherein the time allowed for dissolving the polymer in the surfactant solution and allowing separation is from 10 to 1000 hours.

14. In a process comprising:

injecting into the well a surfactant fluid comprising about 0.1% to about 20.0% of total solute by weight petroleum sulfonate surfactant; about 0.1% to about 5% of total solute by weight solubilizer dispersed in the water; about 0.1 to 10% by weight polymer, wherein the surfactant fluid formed is the product of dissolving the polymer in the water-surfactant-solubilizer fluid, allowing the mixture to separate and separating the fraction with the highest sulfonate content to use as the surfactant fluid, the improvement comprising separating the remaining fraction which contains the lower sulfonate content to add to a polymer slug which is injected after the surfactant slug, forcing said high sulfonate content surfactant slug, and subsequently the low sulfonate content containing enriched polymer slug through the formation and recovering said hydrocarbons.

* * * * *